(12) United States Patent
Hess et al.

(10) Patent No.: US 11,922,364 B2
(45) Date of Patent: Mar. 5, 2024

(54) GEO-VERIFIED DELIVERY SYSTEM

(71) Applicant: United States Postal Service, Washington, DC (US)

(72) Inventors: Juliaann Sanders Hess, Pembroke Pines, FL (US); Seth Lee Johnson, Memphis, TN (US)

(73) Assignee: United States Postal Service, Washington, DC (US)

( * ) Notice: Subject to any disclaimer, the term of this patent is extended or adjusted under 35 U.S.C. 154(b) by 107 days.

(21) Appl. No.: 17/128,617

(22) Filed: Dec. 21, 2020

(65) Prior Publication Data
US 2021/0192443 A1    Jun. 24, 2021

Related U.S. Application Data

(60) Provisional application No. 62/950,860, filed on Dec. 19, 2019.

(51) Int. Cl.
*G06Q 10/08* (2023.01)
*G06F 16/2457* (2019.01)
*G06Q 10/083* (2023.01)
*G06Q 10/0833* (2023.01)
*H04W 4/021* (2018.01)

(52) U.S. Cl.
CPC ... *G06Q 10/0833* (2013.01); *G06F 16/24575* (2019.01); *G06Q 10/0838* (2013.01); *H04W 4/021* (2013.01)

(58) Field of Classification Search
CPC . G06Q 10/08; G06Q 10/0833; G06Q 10/0838
See application file for complete search history.

(56) References Cited

U.S. PATENT DOCUMENTS

| | | | |
|---|---|---|---|
| 9,699,606 B1* | 7/2017 | Bhatia | G06Q 10/083 |
| 11,501,242 B2* | 11/2022 | Staples | G06Q 10/083 |
| 2006/0145837 A1* | 7/2006 | Horton | G08G 1/202 |
| | | | 340/539.13 |
| 2014/0351163 A1* | 11/2014 | Tussy | G06Q 10/083 |
| | | | 705/330 |
| 2018/0357848 A1* | 12/2018 | McLellan | G06Q 10/083 |

OTHER PUBLICATIONS

S. Tuermer, F. Kurz, P. Reinartz and U. Stilla, "Airborne Vehicle Detection in Dense Urban Areas Using HoG Features and Disparity Maps," in IEEE Journal of Selected Topics in Applied Earth Observations and Remote Sensing, vol. 6, No. 6, pp. 2327-2337, Dec. 2013, doi: 10.1109/JSTARS.2013.2242846. (Year: 2013).*

* cited by examiner

*Primary Examiner* — Scott M Tungate
(74) *Attorney, Agent, or Firm* — Knobbe Martens Olson & Bear LLP

(57) ABSTRACT

A system and method for geo-certifying delivery of items is disclosed. In some embodiments, a system tracks the intended delivery addresses of items as well as the actual delivery points. The system then determines if it has geo-verified geo-coordinates for the intended delivery points. If so, the system geo-certifies a delivery if the actual delivery point is within a geofence surrounding the intended delivery address.

20 Claims, 4 Drawing Sheets

GEO-VERIFIED DELIVERY SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/950,860, filed Dec. 19, 2019, the entire contents of which are hereby incorporated by reference.

BACKGROUND

The development relates to a system and method for providing confirmation of accurate delivery of distribution items.

SUMMARY

In some embodiments the system comprises a system for geo-certifying a delivery comprising a delivery database configured to store intended delivery address and delivery point data, a geo-verification database configured to geo-verify the intended delivery address, and a geofence database configured to determine a geofence surrounding the intended delivery address and determine if the delivery point data is contained within the geofence.

In one aspect described herein a system for delivering items, the system comprises a user interface configured to receive a request for a geo-verification for delivery of an item; a delivery database comprising item information and scan information, the item information comprising delivery point information and the delivery event information comprising a location of the item at the time of a delivery of the item; a server in communication with the user interface and the delivery database, the server configured to: receive, from the user interface, item information for the item to be delivered; query, via a processor, the delivery database to identify an intended delivery point based on the received item information; receive, from the delivery database, delivery point information for the identified delivery point; receive, from the delivery database, the delivery event information; and determine, based on the delivery point information and the delivery event information, that the item delivery is geo-verified.

In some embodiments, the system further comprises a geo-verification database, the geo-verification database comprising a plurality of delivery points that have been determined to be geo-verified.

In some embodiments, the server is configured to determine that the item delivery is geo-verified by determining that the item information identifies an intended delivery point for the item that corresponds to one of the plurality of delivery points that has been determined to be geo-verified and that the delivery event information indicates that the location of the item at a time of the delivery item was within a geo-fence of the intended delivery point.

In some embodiments, the server is further configured to determine a delivery point is determined to be geo-verified based on a confidence score.

In some embodiments, the server is configured to determine a confidence score based on historical delivery information for the delivery point.

In some embodiments, the system further comprises a geo-fence database, the geo-fence database comprising geo-fence information for a plurality of delivery points.

In some embodiments, the server is configured to query the geo-fence database, based on the received item information, a geo-fence for the intended delivery point for the item.

In some embodiments, the server is configured to determine that the item delivery is geo-verified by determining that the delivery event information indicates that the location of the item at the time of the delivery of the item is within the geo-fence for the intended delivery point.

In some embodiments, the server is configured to generate, using the geofence for the intended delivery point for the item, a modified geo-fence based on one or more delivery factors.

In some embodiments, the delivery event information comprises scan information indicative of a scan of the physical item and the location of a mobile delivery device at the time of the scan of the physical item.

In some embodiments, the delivery event information comprises an assumed delivery event and a location associated with the assumed delivery event.

In another aspect described herein, a method of delivering items, comprises receiving, in a processor, from a user interface, a request for a geo-verification for delivery of an item; receiving, in a processor, item information for an item to be delivered; querying, via a processor, a delivery database to identify an intended delivery point for the item based on the received item information; receiving, in a processor, from the delivery database, delivery point information for the identified delivery point; receiving, in a processor, from the delivery database, the delivery event information; and determining, in a processor, based on the received delivery point information and the delivery event information, that the item delivery is geo-verified.

In some embodiments, determining that the item information identifies an intended delivery point for the item that corresponds to one of the plurality of delivery points that has been determined to be geo-verified and that the delivery event information indicates that the location of the item at a time of the delivery item was within a geo-fence of the intended delivery point.

In some embodiments, the method further comprises determining, in a processor, that a delivery point is geo-verified based on a confidence score.

In some embodiments, the method further comprises determining, in a processor the confidence score based on historical delivery information for the delivery point.

In some embodiments, the method further comprises querying, by a processor, the geo-fence database based on the received item information to identify a geo-fence associated with the intended delivery point for the item.

In some embodiments, determining that the item delivery is geo-verified comprises determining that the delivery event information indicates that the location of the item at the time of the delivery of the item is within the identified geo-fence for the intended delivery point.

In some embodiments, the method further comprises, generating, in a processor, using the identified geofence, a modified geo-fence based on one or more delivery factors.

In some embodiments, the delivery event information comprises scan information indicative of a scan of the physical item and the location of a mobile delivery device at the time of the scan of the physical item.

In some embodiments, the delivery event information comprises an assumed delivery event and a location associated with the assumed delivery event.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

Figure 1:
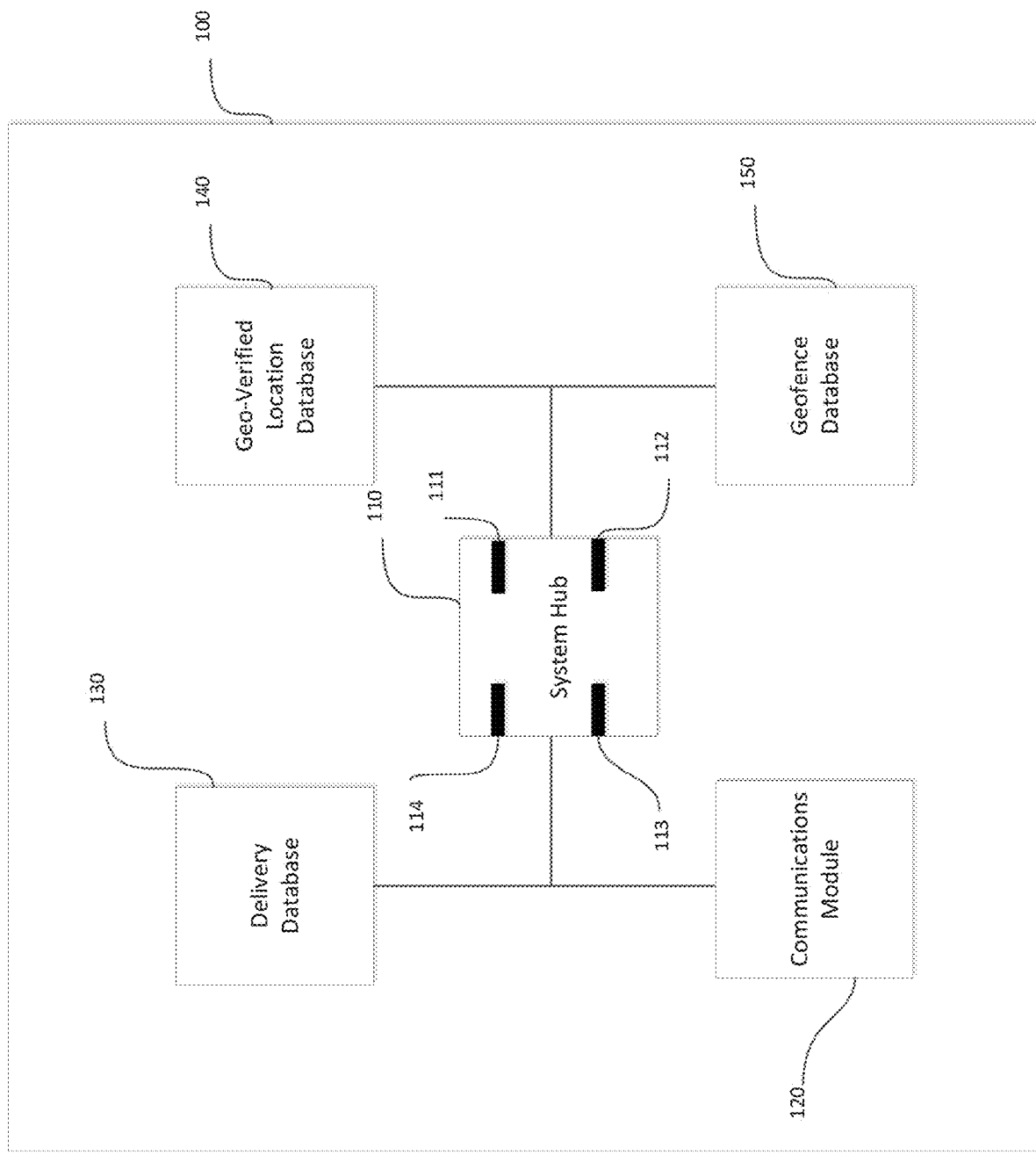
FIG. 1 is a block diagram displaying one embodiment of a system for providing a geo-verified delivery service.

Some customers for the delivery of items require an extra level of certainty that an item is delivered to the correct location. For example, shippers of sensitive or important materials such as pharmaceuticals, perishables, high priority, high value, controlled items, etc. wish to be certain that the items have been delivered to the correct address. Merchants shipping items to purchasers may wish to confirm the item was shipped to the correct location in order to avoid credit card charge disputes. Merchants, businesses, or other entities, prior to sending an item via a distribution network, may also desire confirmation that the delivery point for the shipment is the correct or actual delivery point for the intended recipient. For example, a shipping entity may wish to have an address or destination confirmed for an intended recipient, to be sure the item will get to the intended recipient, before sending the item. Therefore, a system for determining that items were delivered to the correct location and confirmation of the delivery points of intended recipients is greatly desired.

One method for ensuring that an item was delivered to the correct location is to have a geo-verified or geo-certified delivery service. In some embodiments, the geo-verified delivery service allows shippers to request a geo-verified delivery. Then, when the item is delivered, the system determines and/or records the location data of the actual physical location where the delivery occurred, as well as the intended delivery point for the item. The system can then compare the actual location of the delivery with the intended delivery point to determine if the delivery can be geo-verified or geo-certified. In some embodiments, the system can determine whether delivery was made to a geo-verified location. In some embodiments, a geo-verified location can be a location where the system has a high-level of confidence of accurate geodetic coordinates for the actual physical delivery point or delivery address. If the location is geo-verified, the system then checks if the location data for the actual delivery of the item indicates that the delivery occurred within a threshold distance from the coordinates delivery point, or within a geo-fence surrounding the geo-verified delivery point. If so, the system confirms that the delivery occurred at the right location or at the correct delivery point, thereby creating a geo-certified delivery of that item. The terms geo-verified and geo-certified are exemplary only, and are used herein in an exemplary manner, and can be used interchangeably without departing from the scope of the present disclosure.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The systems and methods described herein relate to updating a map or database of delivery points. FIG. 1 is a block diagram of one embodiment of a system 100 for providing a geo-verified delivery service.

In some embodiments, the system 100 can comprise system hub 110, a communication module 120, a delivery database 130, a geo-verified location database 140, and a geofence database 150. The system hub 110 is in wired or wireless communication with a communication module 120, a delivery database 130, a geo-verified location database 140, and a geofence database 150.

In some embodiments, system hub 110 may comprise or be a component of a processing system implemented with one or more processors. The system hub 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, an Intel Xeon®, CORE i9®, i7®, i5®, or i3® processor, an AMD Epyc®, Ryzem®, Phenom®, A-Series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the system 100, and controlling access to and from, and transmitting information and data to and from, the system hub 110 and the constituent components of the system 100, as will be described herein.

The system hub 110 comprises a system memory 113, configured to store information, such as confidence data, item-carrier information, expected deliveries data and the like. The system memory 113 may comprise a memory structure, such as, a database, a comma delimited file, a text file, or other memory structure. The address analytical server system hub 110 is configured to coordinate and direct the activities of the components of the system 100, and to coordinate geo-verifying deliveries.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the system 100, and in some embodiments, with a central server (not shown) or other resource outside the system 100, as desired.

In some embodiments, system hub 110 is in communication with communication module 120. In some embodiments, the communication module 120 may comprise a processor, memory, databases, address and control lines, and other components similar to those described herein for the system hub 110. In other embodiments, communication module 120 may be configured to use the processor, memory, databases, address and control lines, and other components of the system hub 110, or a combination of its own components and the system hub 110's components.

Communication module 120 can be used by the system 100 to communicate with other users of the system 100. For example, communication module 120 can be used by senders of items to request a geo-verified delivery of an item. For example, a sender may log on to a website or other input method and request that a particular delivery be geo-verified. In some embodiments, a user's account may be associated with a geo-verification system and items sent by the sender can be initiate the geo-verified process without additional user input.

In some embodiments, once a delivery has been geo-verified, the communications module can then send a geo-certification notification back to the sender of the item to confirm that the a geo-verified delivery took place. In some embodiments, the communication module 120 can also send a "geo-certification unavailable" message if the service is unavailable for a particular delivery address, or a "geo-certification failed" message if the delivery did not occur at the correct delivery point. In some embodiments, communications module 120 can also be used by item receivers to verify the geolocation of their address. For example, an item receiver may log on to a website or other input method and confirm the geodetic coordinates of their delivery address. For example, the item receiver could receive a map or satellite image with the delivery address marked on the map or image and confirm that map or image is correct. In some embodiments, where a sender or recipient has requested geo-verification or where geo-verification is provided, part of an account, etc., a recipient and/or a sender can receive a notification of delivery of the item, and the notification can include the geo-verification, an insignia, logo, or the like indicating that the delivery was geo-verified.

In some embodiments, the communication module 120 can send a push notification to a sender of an item who requested geo-verification and/or who paid for geo-verification via a smart phone application, a web-interface, text message, or the like.

In some embodiments, system hub 110 is in communication with delivery database 130. In some embodiments, the delivery database 130 may comprise a processor, memory, databases, address and control lines, and other components similar to those described herein for the system hub 110. In other embodiments, delivery database 130 may be configured to use the processor, memory, databases, address and control lines, and other components of the system hub 110, or a combination of its own components and the system hub 110's components.

In some embodiments, the delivery database contains information regarding deliveries of items. In some embodiments, the information can comprise an intended delivery address of an item, the type of item to be delivered, such as package or letter, and the location data for scan events, delivery events, and information for the item. In some embodiments, the location data can comprise the geo-coordinates recorded by a mobile device (not shown) for the delivery of the item. For example, when a delivery resource delivers an item, the delivery resource can use the mobile device to scan the item or the mailbox where the item was delivered and record the geo-coordinates of the mobile device when the scan occurred. Scanning the item or mailbox can include an optical scan, a barcode scan, a scan of a computer readable code on the item, communicating with an RFID tag, a near field communication or Bluetooth interaction, and the like. In some embodiments, the mobile device can instead determine the geo-coordinates of a delivery through breadcrumb data. For example, the mobile device can record its location every second, or other interval of time. The mobile device can then determine that an item was delivered if the mobile device does not move for a certain period of time, or it records that mobile device stays within a small area, for example 3 meters, for a certain period of time.

In some embodiments, system hub 110 is in communication with geo-verified location database 140. In some embodiments, the geo-verified location database 140 may comprise a processor, memory, databases, address and control lines, and other components similar to those described herein for the system hub 110. In other embodiments, geo-verified location database 140 may be configured to use the processor, memory, databases, address and control lines, and other components of the system hub 110, or a combination of its own components and the system hub 110's components.

In some embodiments, geo-verified location database 140 contains geo-coordinates for delivery points, and delivery point classifiers, such as addresses of houses, apartment buildings, and mailboxes. In some embodiments, the geo-verified location database 140 contains multiple geo-coordinate location types associated with a single delivery address. For example, where the delivery point is a house or business, the geo-verified location database can contain geo-coordinates for a mailbox where letters are delivered, and the geo-coordinates for a porch where parcels or packages are delivered. Where the delivery point is in, for example, an apartment building, the database can contain geo-coordinates for a group of boxes or mail slots where letters are delivered, and geo-coordinates for the front desk where packages are delivered, and information identifying the geo-coordinates as corresponding to the desk, the mailbox, etc. In some embodiments, the geo-coordinates associated with a delivery address may only be the geo-coordinates for the centerline of the street immediately in front of the delivery address. In some embodiments, the geo-verified location database 140 can also contain information about the type of area a delivery address is such as rural home, suburban home, apartment building, skyscraper, or other types of buildings.

In some embodiments, the geo-verified location database 140 also determines whether the geo-coordinates for a specific delivery point are accurate, making the location a geo-verified location. In some embodiments, the geo-verified location database 140 contains a confidence factor for each location in the database. In some embodiments, if the confidence factor is high enough, the location or delivery point can be considered geo-verified. In some embodiments, the confidence factor is based on the number of deliveries to a location and/or the lack of customer complaints for failure of deliveries to a certain location. In some embodiments, the confidence factor is based how tightly clustered the geo-coordinate locations for past deliveries at a specific address or delivery point have been, whether there have been a threshold number of scan events at the delivery point in the past, whether scan events or delivery events preceding and subsequent to the delivery occurred within geofences or are geo-verified, and/or occurred at points along the predicted or established route for a delivery resource. In some embodiments, the confidence factor can be on a scale from 1-100, or on any other desired scale or ranking system.

In some embodiments, the geo-verified location database 140 can also consider a location verified if a second source, for example, a separate internal system, an external system, or a third party source confirms the geo-coordinates of the location. In some embodiments, customers can confirm the location through the communication module 120 as described above. In some embodiments, the geo-verified location database can also use a secondary location database to verify geo-coordinates. For example, the geo-verified location database 140 can retrieve geo-coordinates associated with a delivery point from a secondary database and compare it to the geo-coordinates of its database. If the secondary geo-coordinates are within a certain distance threshold of the geo-coordinates of the delivery address of the location database 140, then the system considers the geo-coordinates geo-verified. In some embodiments of the invention, the distance threshold between the points could be 1 meter, 2 meters, 5 meters, 10 meters or, 20 meters.

In some embodiments, the threshold of the two sets of geo-coordinates can change based on the type of delivery point, the area of the delivery point and the type of item to be delivered. For example, the threshold distance could be decreased for rural areas where there are strong, interrupted GPS signals, and decreased for high density urban areas where GPS systems have lower accuracy based on surrounding buildings, etc. For deliveries of letters to households, the distance thresholds may be increased for delivery of letters to mailboxes, which can be located some distance from the house, and decreased for delivery of packages, which are delivered at porches. The tighter threshold for delivery of packages can be done due to customers' worries or concerns about accuracy, about packages being placed someplace susceptible to theft, or for other reasons. In some embodiments, if the geo-coordinates are for a point in the center line of the street in front of the house, the threshold distance threshold can be increased along one axis, to accommodate the width of the street, but not the other axis.

In some embodiments, the geo-verified location database 140 contains a list of geo-verified delivery points identified based upon the above processes. In some other embodiments, the geo-verified location database 140 determines if a particular delivery point is geo-verified each time it is queried, or at a given periodicity.

In some embodiments, system hub 110 is in communication with geofence database 150. In some embodiments, the geofence database 150 may comprise a processor, memory, databases, address and control lines, and other components similar to those described herein for the system hub 110. In other embodiments, geofence database 150 may be configured to use the processor, memory, databases, address and control lines, and other components of the system hub 110, or a combination of its own components and the system hub 110's components.

In some embodiments, geofence database 150 can determine whether a delivery occurred at a delivery point. In some embodiments, the geofence database 150 can request the intended delivery point for a specific item delivery from the delivery database 130. Then geofence database 150 can request the geo-coordinates for that delivery point from the geo-verified location database 140. Once the coordinates are received, the geo-fence database can calculate a geofence surrounding the delivery point. In some embodiments, the geo-fence can use a default geofence around the location. For example, the default geofence could be a circle with a radius of 5 meters surrounding the delivery point. In some embodiments, the default geofence can be input by users of the system for each delivery point. In some embodiments, the default geofence can be modified based on geo-fence factors. For example in areas with reduced GPS accuracy, such as places with high buildings that obscure GPS signals, the size of the geo-fence can be increased. In some embodiments, in rural areas where delivery points are farther apart, the size of geo-fences can be increased, as desired. Similarly, for delivery points located in rural areas, the size of a geofence can be increased, while the geofence could be decreased for urban areas. In some embodiments, the geofence size can be increased or decreased based on the type of delivery resource route that delivers to a particular delivery address. For example, delivery addresses where the delivery resource walks the route could have the size of the geofence decreased, while a route with driving deliveries would have the size of the geofence increased. In some embodiments, the type of delivery service could also affect the size of the geofence. For example geofences or threshold distances for first class deliveries or deliveries requiring signatures could be reduced to ensure greater accuracy. In some embodiments, the type of mobile device that collected the location data for a particular delivery could also affect the size of the geofence. For example, the geofence could be increased in size when the delivery was made by a type of mobile device with a less accurate GPS circuit or system.

Once the geofence database 150 has determined the geo-fence for the geo-verified location of a delivery based on the location database and factors described herein, the database can then determine whether the geo-coordinates for the actual delivery of the item are within the geo-fence. If so, the system 100 determines that the delivery occurred in the correct location and can send a message to the appropriate parties that the delivery has been geo-verified.

Figure 2:
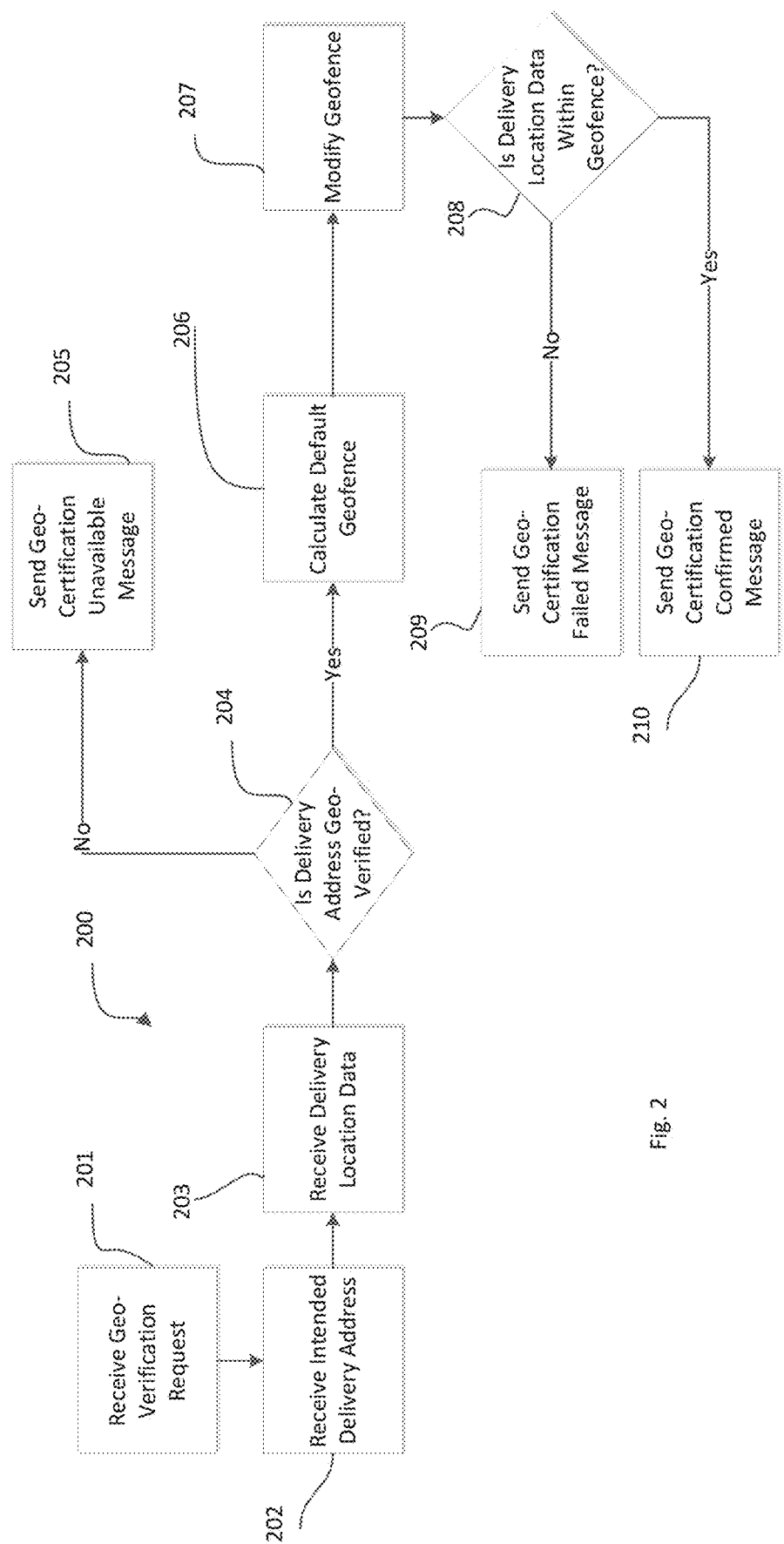
FIG. 2 is a flow chart depicting one embodiment of a process for using a geo-verification system to geo-certify a delivery.

FIG. 2 shows one embodiment of a process 200 for geo-verifying an item delivery. The process 200 begins with process block 201. In process block 201, the system 100 receives a request to geo-verify a specific delivery through communication module 120. This process can be initiated by a signal from a mobile delivery device that a delivery scan event has occurred, via the delivery database 130 which determines that the delivery scan occurred for an item for which geo-certified delivery was requested.

In some embodiments, the request can come from a sender, shipper, or other entity desiring to send an item, with the sending entity desiring to confirm the delivery point for the item. This may occur, for example, where a sender is sending a controlled substance, such as a pharmaceutical, a dangerous substance, a high value item, etc., and the sending entity desires greater assurance that the delivery point for the intended recipient is correct.

In some embodiments, the request is triggered when the system hub 110 receives scan information for an item for which geo-verification has been requested, scheduled, ordered, etc. In some embodiments, the system hub 110 receives scan event information for many items. The system hub 110 can query a memory, such as the delivery database, to determine whether the item scanned is associated with a geo-verification request, order, etc.

In some embodiments, the request for the geo-verification can originate from a shipper or a receiver, and it can be received at a time before or after the delivery is completed. The request can be initiated by providing a tracking number, a scan of a computer readable code, or an item identifier associated with the item for delivery. The input of the identifier can come via an input device, such as a mobile application, a website, or the like.

In some embodiments, the request can be initiated by a customer service process or other process in response to a query from a recipient or a shipper. For example, the request can be provided when a recipient or a shipper has not received an item that was to be delivered, if there is a delay, or other delivery issue.

When the request is received, the process then proceeds to process block 202, wherein the delivery database 130 determines the intended delivery address for the delivery that is requested to be geo-verified. In some embodiments, the shipper provides the address for the intended recipient to the delivery database 130. In some embodiments, the scan event, such as the delivery event, provides an item identifier or code as part of the scan. The item identifier or code is associated with a delivery point, such as a delivery address, and/or the item identifier or code encodes the delivery point. The system 110 can use the item identifier or code to identify the delivery point.

In some embodiments, the delivery point or delivery address can be provided by the shipper or recipient. For example, a recipient can request the status of a delivery. The delivery point can be determined from the application used to request the delivery point, can be determined from login information, or from other user identifiers.

The process then proceeds to process block 203, wherein the delivery database 130 receives the geo-coordinates for the location that the item was delivered. When a scan event, such as a delivery event occurs, the location where the scan occurs can be determined. In some embodiments, a mobile device determines and stores the geo-coordinates of the device when the item is scanned. In some embodiments, the delivery event can be an implied event or assumed event using breadcrumb data as described herein. In some embodiments, server 110 receives the geo-coordinates from the delivery database 130 that are associated with the scan event or delivery event where the item was scanned on delivery.

In some embodiments, where the delivery event is an inferred or implied event, the system 110 queries the delivery database 130 or another database to retrieve the locations of the mobile device at the time of the implied delivery event. The location of the mobile computing device can be identified by identifying a time of an assumed delivery, and finding a location of the mobile delivery device at the of the assumed delivery event. In some embodiments, the location can be determined by interpolating a location of the mobile delivery device between a preceding delivery point along a route and a subsequent delivery point along the route. The server 110 can identify the two closest delivery points along a route on which the intended delivery point for the item is located, and determine whether there is can data for deliveries to those points. The system 110 can pick a midpoint between the two points, for example, if there is an immediately preceding delivery point and the immediately subsequent point. If the closest delivery points for which scan data exists, the server 110 can use a baseline time, or an average time, or historical delivery data for the carrier and the route to estimate a time when the delivery of the item in question was delivered. The location of the mobile computing device at the estimated time can be determined, and that location information can be associated with the delivery of the item.

In some embodiments, where the delivery event is an assumed event, the confidence score associated with the geo-verification, as described elsewhere herein, can be adjusted.

In some embodiments, the delivery database 130 receives the address of an intended recipient and/or an intended recipient identifier, such as a name, handle, ID code or number, or the like, from a shipper.

The process then proceeds to decision block 204, wherein the server determines whether the location of the scan is able to be geo-verified. For example, the delivery database 130 sends to the server 110, the location information when the item was scanned for delivery or where the delivery event was assumed or estimated to have occurred. delivery point and/or the delivery address to the geo-verified location database 140. The server 110 then queries the geo-verified location database 140 to determine if the location of the scan corresponds to a delivery point or address which has been previously geo-verified based on historical data, as described elsewhere herein. In some embodiments, the actual location of the delivery, or the location where the scan occurred, can be geo-verified if the confidence factor associated with the geo-coordinates for the address associated with the scan location satisfies a threshold. In some embodiments, the address is geo-verified if there is a second source verifying the location.

In some embodiments, the server 110 can determine a geo-verified status based on a geofence or geographic location of a scan or delivery event and comparing that to the intended delivery point and the coordinates of the intended delivery point, without determining whether an address has a historical geo-verified status.

If the address is not geo-verified, the process proceeds to process block 205, where the communication module 120 sends a "geo-certification unavailable" message to the requester of the geo-verified delivery.

In some embodiments, the delivery database 130 sends the intended recipient identifier and/or the intended delivery address to the geo-verified location database 140. The geo-verified location database 140 uses the intended recipient identifier to find an associated geo-verified delivery address. If there is no geo-verified delivery address corresponding to the intended recipient or intended delivery address, this is also sent to the shipping entity via the user interface, the process proceeds to process block 205.

In some embodiments, if an associated geo-verified delivery address is found for the intended delivery point for the item, the geo-verified location database 140 sends, via the system hub 110, the geo-verified delivery address to the delivery database, or to a user interface in communication with the system hub 110. In some embodiments, the system hub 110 can compare the geo-verified delivery address to the intended delivery address provided by the sending entity, by the recipient, or that identified in the item information for the item. The comparison information can be sent to the sending entity via the interface as well.

If the delivery address is geo-verified, and/or if the system is determining a geo-verification using geofences, the process moves to block 206. In process block 206, the geofence database 150 retrieves the default geofence for the intended delivery address. In some embodiments, the default geofence is a 5 meter radius circle surrounding the area around the geo-coordinates of the geo-verified delivery address, or a custom default geo-fence inputted by the user.

In some embodiments, the system 110 determines a geo-fence surrounding the intended delivery point for the item. The geo-fence can be a standard value, such as 3 meters, or can be a modified value based on the area in which the intended delivery point is located.

The process 200 proceeds to block 207, wherein the geofence database 150 modifies the default geofence based upon modification factors in the manner described above. The system hub 110 can pass, from the delivery database 130, or from another location, a factor or characteristic of the delivery, such as the route identifier or similar route identifying information (e.g., route location, ZIP code, walking route, driving route, etc.), route type (e.g., rural, urban, sub-urban), equipment type (e.g., mobile device type, mailbox type, etc.). Based on this information, the system hub 110 can modify the default geofence parameters as desired.

Process 200 proceeds to decision block 208, wherein the geofence database 150 determines if the item delivery to be geo-verified occurred within the geo-fence for the geo-verified delivery address or for the intended delivery point, based on the location data for the delivery scan or assumed delivery event received in the delivery database 130. If the coordinates of the actual or assumed delivery event are within the geo-fence or the modified geo-fence of the delivery address, the intended delivery point, or the historically geo-verified delivery point, the system 100 uses the communication module 120 to send a "geo-certification confirmed" message. The system hub 110 can pass the message to the requestor, such as the shipper, the recipient, or a distribution network or resource, or the system hub 110 or another system can prepare a geo-certified delivery notification and provide it to the sender, recipient, both, or any other desired entity. In some embodiments, a geo-certified message can be sent to the user who requested geo-verification as shown in process block 210. If not, the system instead sends a "geo-certification failed" or similar message as shown in process block 209.

Figure 3:
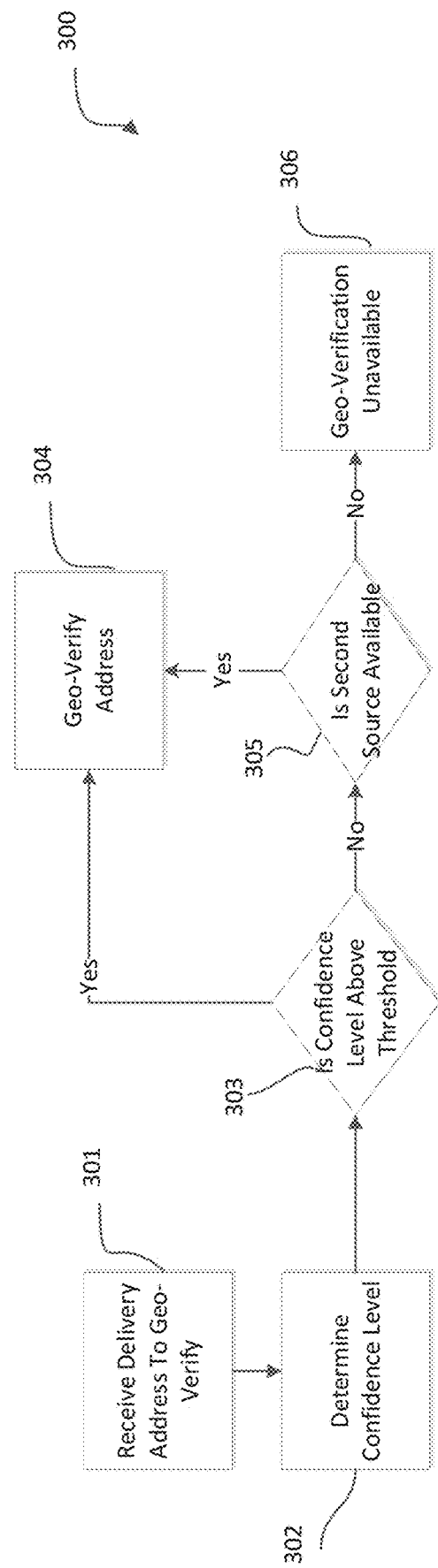
FIG. 3 is a flow chart depicting one embodiment of a process for determining whether a location is geo-verified.

FIG. 3 is a flow chart depicting one embodiment of a process for determining whether a location is geo-verified. The process begins in process block 301. In process block 301, the geo-verified location database 140 receives a delivery address to geo-verify from the delivery database 130. The process then proceeds to process bock 302.

In process block 302, the geo-verified location database determines the confidence level that the database has in the geo-coordinates associated with the delivery address. In some embodiments, this confidence level could be on a scale from 1-100. The confidence level can be based on the number and type of historical delivery information, such as scan information, for items that have been delivered to the delivery point. For example, if there have been many successful deliveries to the delivery point that have occurred at locations that are similar or the same according to the location of the mobile delivery device at the time of delivery, the confidence value can be high. In some embodiments, if the delivery point is located between two delivery points that have high confidence, the confidence of the in-between delivery point can be higher than it otherwise would be.

The process then proceeds to decision block 303, wherein the geo-verified location database 140 determines whether the confidence level is above a certain threshold. In some embodiments, the threshold could be 70, 80, or 90 out of a possible 100. If the confidence level is above the threshold, the process then proceeds to process block 304 where the geo-verified location database 140 confirms to the system 100 that the address is geo-verified. If not, the process proceeds to decision block 305.

In decision block 305, the geo-verified location database 140 determines whether a second source is available to verify the geo-coordinates of the address. In some embodiments, the second source is a separate third party database of geographic location information. In some embodiments, the second source can be a user of system 100 confirming the coordinates through the communication module 120. For example, a resident or entity at a delivery point can, using a mobile delivery device, send geographic coordinates of the resident or entity's delivery point to the distribution network or server 110. A recipient may desire to do this to enable geo-verified deliveries to the delivery point. In some embodiments, the second source can be a governmental source, information from a utility, or from another database or system that has or maintains geographic coordinate information for delivery points.

If a second source is available, the process then proceeds to process block 304 where the geo-verified location database 140 confirms to the system 100 that the address is geo-verified. If a second source is available, the confidence number can be increased, such that it can rise above the threshold for geo-verification.

If not, the process then proceeds to process block 306 where the geo-verified location database 140 confirms to the system 100 that geo-verification is unavailable.

Figure 4:
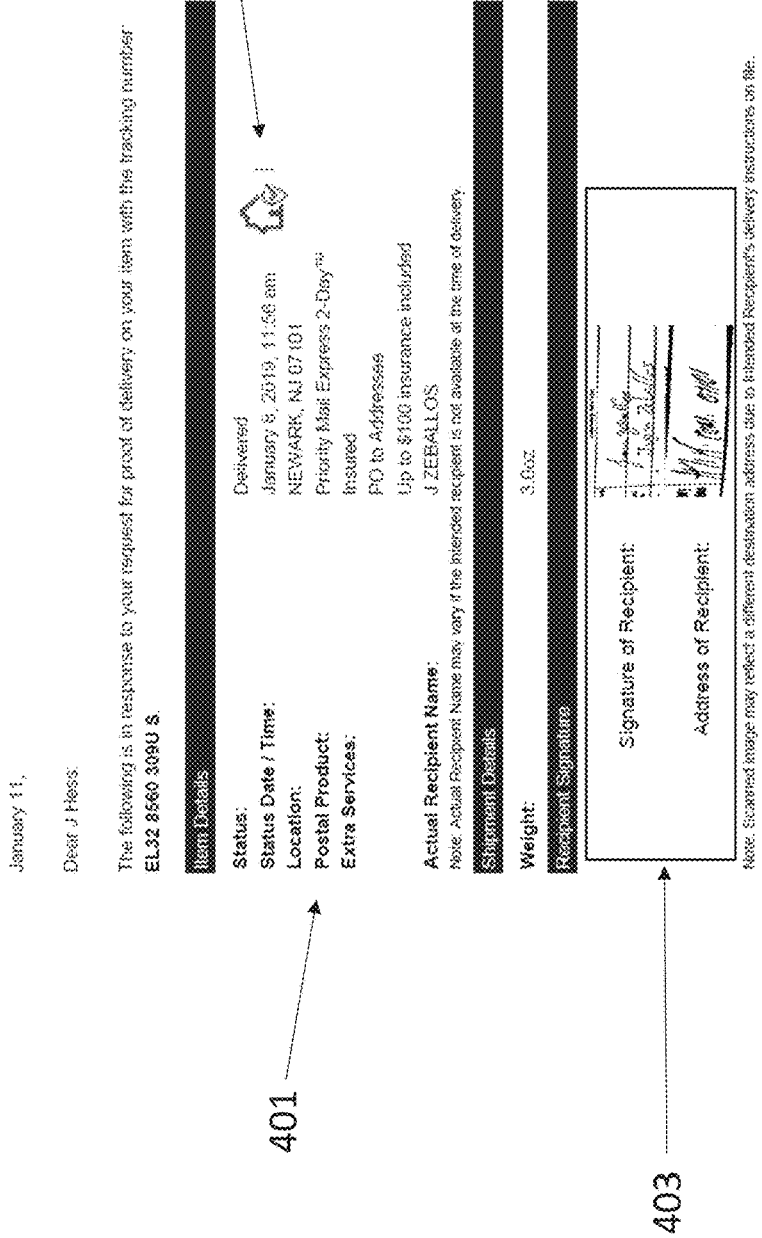
FIG. 4 is one embodiment of a message that could be sent by the geo-verification system confirming that a geo-certified delivery occurred.

FIG. 4 illustrates an exemplary embodiment of a message that could be sent by the geo-verification system confirming that a geo-verified delivery occurred. In some embodiments, the message can include a details block that includes the details of the item that was delivered. In some embodiments, the details block can include details such as the delivery status of the item, the time and date it was delivered, the delivery address of the item, the shipping method of the item, the name of the recipient and any special delivery services for the item such as insurance or signature requirement. In some embodiments, the message can also include a geo-certification logo, stamp, icon, or visual indicator 402. Visual indicator 402 can be an indicator of whether a delivery was geo-certified. In some embodiments, a green indicator can indicate a delivery was geo-certified, a yellow stamp can indicate that geo-verification was unavailable, that a confidence level was below a threshold, or was lower than the verification threshold and a red stamp can indicate that geo-certification failed. In some embodiments, a written message is used indicating geo-certification status in addition to or in conjunction with the visual indicator 402. In some embodiments, the message can also include signature block 403. In some embodiments, signature block 403 can be a picture of the signature of the recipient of the item confirming that they received the item.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for delivering items, the system comprising:
   a user interface configured to receive, from an item shipper, a request for a geo-verification for delivery of an item;
   a location database comprising geo-coordinates for a plurality of location types for a plurality of delivery points;
   a confidence database storing a confidence score for the plurality of delivery points, wherein the confidence score for each of the plurality of delivery points;
   a delivery database comprising item information and delivery event information, the item information comprising a delivery type and delivery point information, and the delivery event information comprising a geo-coordinate of the item at a time of a delivery of the item;
   a server in communication with the user interface and the delivery database, the server configured to:
   receive, from the user interface, item information for the item to be delivered;

query, via a processor, the delivery database to identify an intended delivery point from the plurality of delivery points and the delivery type based on the received item information;

query, the location database using the identified delivery point to identify geo-coordinates for the plurality of location types for the identified delivery point;

determine, that the received geo-coordinates of the item at the time of delivery of the item correspond to the geo-coordinates of one of the location types for the delivery point;

query the confidence database to identify the confidence score for the identified delivery point;

determine that the confidence score for the identified delivery point meets or exceeds a confidence threshold;

determine, based on the determination that the received geo-coordinates of the item at the time of delivery of the item correspond to the geo-coordinates of one of the location types for the delivery point, and on the determination that the confidence score for the identified delivery point meets or exceeds the confidence threshold, that the item delivery is geo-verified; and send, to the item shipper, a notification that the item delivery is geo-verified and the location type.

2. The system of claim 1, wherein the plurality of delivery points that have been determined to be verified delivery points based on the plurality of delivery points having geo-coordinates for the plurality of location types whose accuracy confidence meets a confidence threshold.

3. The system of claim 2, wherein the server is configured to determine that the item delivery is geo-verified by determining that that the delivery event information indicates that the location of the item at a time of the delivery item was within a geo-fence of the geo-coordinates for one of the location types for the identified delivery point.

4. The system of claim 1, wherein the confidence score for each of the plurality of delivery points is determined based on how tightly clustered geo-coordinate locations for past deliveries to each of the plurality delivery points have been.

5. The system of claim 1, further comprising a geo-fence database, the geo-fence database comprising geo-fence information for each of the geo-coordinates for the plurality of location types for the delivery point.

6. The system of claim 5, wherein the server is configured to query the geo-fence database, based on the received item information and the identified delivery point, to generate a modified geo-fence around each of the plurality of location types for the identified delivery point based on one or more delivery factors.

7. The system of claim 6, wherein the server is configured to determine that the item delivery is geo-verified by determining that the delivery event information indicates that the location of the item at the time of the delivery of the item is within the modified geo-fence around the geo-coordinates for the one location type of the plurality of location types for the identified delivery point.

8. The system of claim 6, wherein the one or more delivery factors comprise route identifying information.

9. The system of claim 1, wherein the delivery event information further comprises scan information indicative of a scan of the item and the location of a mobile delivery device at the time of the scan of the item.

10. The system of claim 1, wherein the plurality of location types comprise a mailbox and a porch, and wherein the geo-coordinates for the plurality of location types include a geo-coordinate for the mailbox and a geo-coordinate for a porch at the delivery point, and wherein the confidence database stores as confidence score for each of the plurality of location types for each of the plurality of delivery points, and wherein the server is further configured to determine that the confidence score for the location type at the identified delivery point meets or exceeds the confidence threshold.

11. A method of delivering items, the method comprising:
receiving, in a processor, from an item shipper via a user interface, a request for a geo-verification for delivery of an item;

receiving, in a processor, item information for an item to be delivered, the item information comprising a delivery type and delivery point information;

receiving, in a processor, delivery event information from a scan of the item, the delivery event information comprising a geo-coordinate of the item at a time of a delivery of the item;

querying, via a processor, a delivery database to identify an intended delivery point for the item based on the received item information;

querying, via a processor, a location database using the identified delivery point, the location database comprising geo-coordinates for a plurality of location types for a delivery point;

querying, via a processor, a confidence database to identify a confidence score for the identified delivery point;

determining, in a processor, that the confidence score for the identified delivery point meets or exceeds a confidence threshold;

determining that the received geo-coordinates of the item at the time of delivery of the item correspond to the geo-coordinates of one of the location types for the delivery point;

determining, in a processor, based on the determination that the received geo-coordinates of the item at the time of delivery of the item correspond to the geo-coordinates of one of the location types for the delivery point, and on the determination that the confidence score for the identified delivery point meets or exceeds the confidence threshold, that the item delivery is geo-verified; and sending a notification to the item shipper that the item delivery is geo-verified and the location type.

12. The method of claim 11, determining that the item delivery is geo-verified comprises determining that the delivery event information indicates that the geo-coordinate of the item at a time of the delivery item was within a geo-fence of the geo-coordinates of the one of the plurality of location types for the intended delivery point.

13. The method of claim 12, wherein determining whether the identified delivery point is a verified delivery point comprises determining, in a processor, that the intended delivery point corresponds to geodetic coordinates whose accuracy confidence meets a confidence threshold.

14. The method of claim 13, further comprising, determining, in a processor the accuracy confidence based on historical delivery information for the delivery point.

15. The method of claim 11, further comprising querying, by a processor, a geo-fence database based on the received item information and the identified delivery point to generate a modified geo-fence around the geo-coordinates of each of the plurality of location types for the intended delivery point based on one or more delivery factors.

16. The method of claim 15, wherein determining that the item delivery is geo-verified comprises determining that the delivery event information indicates that the location of the item at the time of the delivery of the item is within the modified geo-fence around the geo-coordinates of the one of the plurality of location types for the intended delivery point.

17. The method of claim 16, wherein the one or more delivery factors comprise route identifying information.

18. The method of claim 11, wherein the delivery event information comprises scan information indicative of a scan of the item and the location of a mobile delivery device at the time of the scan of the item.

19. The method of claim 11, wherein the plurality of location types comprise a mailbox and a porch, and wherein the geo-coordinates for the plurality of location types include a geo-coordinate for the mailbox and a geo-coordinate for a porch at the delivery point.

20. The method of claim 19, wherein the confidence database stores as confidence score for each of the plurality of location types, determining that the item delivery is geo-verified comprises determining that the geo-coordinates of the item of the item at the time of delivery of the item are within a geo-fence around the geo-coordinates of the mailbox location type, and determining that the confidence score for the mailbox location type meets or exceeds the confidence threshold, and wherein sending a notification to the item shipper sending the item shipper the notification that the item is geo-verified and that the item was delivered to the mailbox.

* * * * *

UNITED STATES PATENT AND TRADEMARK OFFICE
CERTIFICATE OF CORRECTION

PATENT NO. : 11,922,364 B2
APPLICATION NO. : 17/128617
DATED : March 5, 2024
INVENTOR(S) : Juliaann Sanders Hess et al.

It is certified that error appears in the above-identified patent and that said Letters Patent is hereby corrected as shown below:

In the Specification

Column 4, Line 42, delete "Ryzem®," and insert -- Ryzen®, --.

Column 5, Line 39, delete "the a" and insert -- the --.

In the Claims

Column 15, Line 33, Claim 3, delete "that that" and insert -- that --.

Column 17, Line 19, Claim 20, delete "of the item of the item" and insert -- of the item --.

Signed and Sealed this
Second Day of July, 2024

Katherine Kelly Vidal
*Director of the United States Patent and Trademark Office*